(No Model.)
C. F. JOHNSON.
FORCE FEED FERTILIZER DISTRIBUTER.
No. 285,413. Patented Sept. 25, 1883.
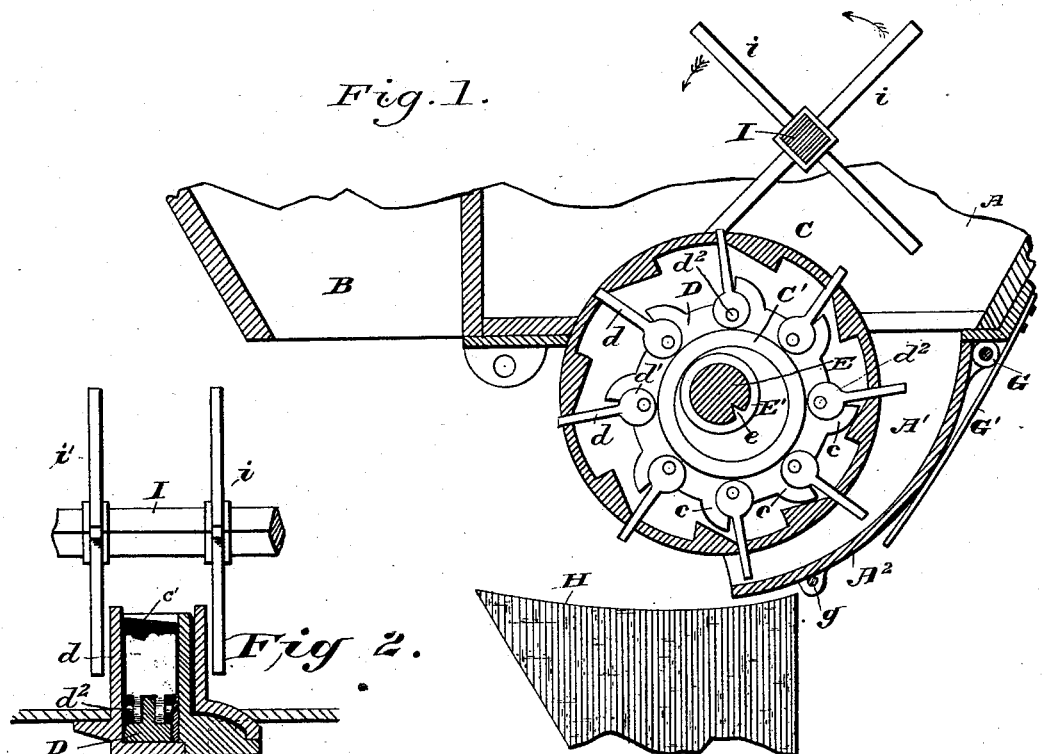
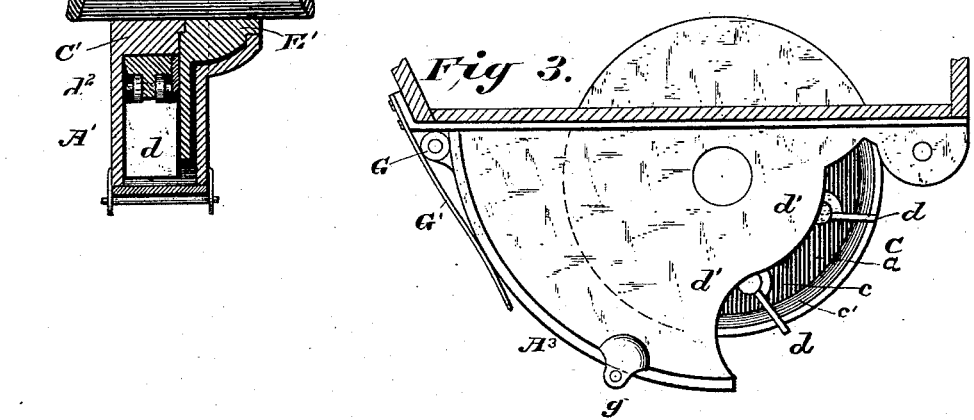
Attest.
Geo. T. Smallwood Jr.
Rex. Smith.
Inventor.
Charles F. Johnson.
By A. M. Smith,
atty.

UNITED STATES PATENT OFFICE.

CHARLES F. JOHNSON, OF OWEGO, NEW YORK.

FORCE-FEED FERTILIZER-DISTRIBUTER.

SPECIFICATION forming part of Letters Patent No. 285,413, dated September 25, 1883.

Application filed April 7, 1883. (No model.)

*To all whom it may concern:*

Be it known that I, CHARLES F. JOHNSON, of Owego, county of Tioga, and State of New York, have invented a new and useful Improvement in Force-Feed Fertilizer-Distributers, of which the following is a full, clear, and exact description, reference being had to the accompanying drawings, making part of this specification.

My invention relates to an improvement in what are known as force-feed fertilizer-distributers, applicable as well to the distribution of grain, &c., as to fertilizers for measuring off and ejecting from the hopper at regular intervals the required amount of the material contained in said hopper; and to this end it consists of a revolving cylinder or wheel situated in the bottom of the hopper-box and projecting slightly into the same, the peripheral surface of said cylinder or wheel being perforated at regular intervals, for permitting the passage and oscillation of buckets or paddles through them, the buckets being pivoted to and carrying with them in their rotation an eccentric-strap working around a stationary eccentric formed upon one of the side walls of the distributer-wheel casing, whereby the buckets are projected through the perforations and beyond the peripheral face of the wheel or cylinder referred to, adapting them to reach up into the material in the hopper, and by their rotation to carry with them a portion of the same through a guiding-channel, at the terminus of which said material drops by gravity into a suitable tube, whence it is conveyed to the ground; or it may be delivered directly from the cylinder to the ground, as may be preferred.

It further consists in the combination, with the feathering buckets of a fertilizer-distributer, of a casing having a hinged bottom held in place by a spring, adapting the said bottom to yield and permit the passage and escape of stones or other large articles between it and the cylinder without injury to the parts thereof, and in certain details of construction and arrangement hereinafter set forth.

Figure 1 represents a vertical section through the lower part of a hopper with my improvements applied, shown also partly in section. Fig. 2 is a transverse section through my improved distributer, and Fig. 3 is a side elevation, and Fig. 4 is a detached view, of one of the buckets or paddles.

In the accompanying drawings, A and B represent portions of the fertilizer and grain hoppers, respectively, of a grain-drill to which my improvements are applied. $A'$ $A^2$ represent the casing inclosing the distributer-wheel C. The short cylinder or wheel C is mounted upon a shaft, E, and is feathered to the latter by means of a rib or projection, $e$, formed in its hub, entering a corresponding groove in the axle upon which the wheel is mounted.

Upon one of the side walls of the distributer-casing $A'$ is cast or otherwise rigidly secured an eccentric, $C'$, whose center is slightly below and in rear or in front of the center of the revolving cylinder C, according to the relative arrangement of the seed and fertilizer hoppers, and around said stationary eccentric is what may be termed an "eccentric-strap," D, of malleable iron or other suitable material, having shoulders $c$ $c$, for a purpose which will be explained. To this strap buckets or paddles (shown in detail in Fig. 4) are hinged by pivots $d^2$. These paddles have formed on their inner ends perforated lugs or ears $d'$, arranged at such a distance apart that when applied to the eccentric-strap D the latter will fit snugly between them and allow said paddles to vibrate freely, which is essential to the operation of the device, as will be shown. It is evident that the paddles must have this capacity of oscillating slightly, as well as of pushing out and drawing back through the perforations in the peripheral face of the cylinder, for as the eccentric-strap is carried around the stationary eccentric with a revolution uniform with that of the cylinder its center is forced to describe a circle around the center of the feed-wheel.

With reference to any point of the cylinder or wheel any point of the eccentric-strap describes a circle whose diameter is equal to the throw of the paddles. Consequently while the cylinder or feed-wheel makes a revolution around its center the inner pivoted ends of the paddles not only partake of said revolution, but also describe the small circle referred to, equal in diameter to the throw of the buckets, thereby giving to the latter an oscillation back and forth across the radii of the cylinder or feed-wheel. The paddles are hinged to the eccentric-strap, as shown and described; but projections on said strap, above referred to, are provided to limit their oscillation. As soon as any bucket is thrown forward the shoulder c comes in contact with it, and, acting as a brace, gives rigidity to the bucket, and the latter passing through the peripheral perforations of wheel C when the latter is rotated, the paddles compel the strap D to revolve around the eccentric C'. The eccentric C' is so arranged relatively to the center of the cylinder as to cause the buckets to be protruded farthest as they pass along the channel formed between the side walls of the distributer-wheel casing, the hinged bottom, and the cylinder itself. This hinged bottom A² of the distributer-wheel casing is pivoted at its upper end, (shown at G, Fig. 1,) and when in position rests against the lower edges of the side walls of said casing, being curved to follow said lower edges and form a suitable channel for the passage of the fertilizer or material contained in the hopper. For the purpose of sustaining and holding the bottom A² against its seat, formed by the edges of the side walls above referred to, a short spring, G', is provided, secured to the lower edge of the hopper-box or other suitable point, and bearing against the lower surface of the hinged bottom, as shown in Fig. 1.

It will be apparent that if anything solid—such as a stone or piece of wood—gets into the channel and is caught by the paddles, instead of injuring the mechanism, it will make room for itself by forcing the hinged bottom A² outward until it has escaped, when the spring G will cause the said bottom to resume its normal position. Instead of the spring, a small wooden peg may be used, passing through an ear on the side casing-plate, as shown at g, adapted, when any extra strain is put upon it, to break, and thus allow the bottom to swing downward; but the spring is the preferable construction. The channel referred to is constructed, preferably, so as to terminate about midway beneath the center of the distributer-wheel, and immediately underneath said terminus is the mouth of the tube H, for the purpose of conveying the material to the ground after it leaves the wheel C. Said tube H is also adapted to receive the grain from hopper B.

It is often found desirable to provide a "stirrer" or agitator, I, or several of them, within the hopper-box, for loosening the material contained therein and preventing its packing, and for this purpose a shaft is passed through the hopper and the stirrers mounted thereon, the shaft being driven at the desired speed from one of the ground or carrying wheels, or in any preferred manner.

The stirrer for each distributing-wheel is composed of two sets of arms, i i', as shown in Fig. 2, placed at such a distance apart that they will pass on either side of the distributer-wheel, their action being not only to loosen the material in the hopper and prevent its arching over the wheel, but also to bring the material down to the wheel within reach of the buckets and push it toward the mouth of the channel. To accomplish this result in the most satisfactory manner the stirrer is rotated in a direction opposite to the direction of rotation of the distributer-wheel, as indicated by the arrows in Fig. 1.

The inner surface of the peripheral flange or rim of the wheel C is by preference made sloping or tapering toward the open side thereof, as shown at c', Figs. 2 and 3, and an opening is provided at a in the casing A' on said side, this construction affording means of escape for dust and dirt, which would otherwise accumulate and interfere with the operation of the inclosed mechanism. As another modification the eccentric may be made adjustable, so that it can be moved for changing the throw of the buckets, if desired; also, the quantity of fertilizer to be distributed may be regulated by change of gears actuating the axle of the distributer-wheel.

I am aware that radially-moving buckets have been employed in connection with distributer-wheels adapted to be moved out and in for acting upon the material contained in the hopper for discharging the same, and also that revolving stirrers have been used for agitating the material in the hopper. Therefore I do not claim these features, broadly.

Having now described my invention, what I claim as new is—

1. In a fertilizer-distributer, the rotating axle, in combination with a stationary eccentric secured to the distributer-wheel casing and surrounding said axle, and radially-moving buckets rotating around said eccentric and receiving their radial movements therefrom.

2. A distributer-wheel provided with hinged buckets, in combination with means for automatically imparting radial movements to said buckets in the progress of their revolution, substantially as described.

3. In a fertilizer-distributer, the rotating axle, the distributing-wheel driven thereby, and a stationary eccentric surrounding said rotating axle, in combination with an eccentric-strap revolving around said eccentric, and buckets hinged thereto and moved radially through perforations in the peripheral face of the said distributing-wheel by means of said eccentric and strap, substantially as described.

4. A distributing-wheel having its peripheral face perforated, in combination with buckets hinged to an eccentric-strap, and adapted to be oscillated or moved radially in said perforations by the revolution of said eccentric-strap around its eccentric, substantially as set forth.

5. The hinged radially-moving buckets rotated by the distributer-wheel, in combination with an eccentric-strap, to which said buckets are hinged, revolving around a stationary eccentric and rotated by said buckets, substantially as described.

6. The hinged bottom or apron G, in combination with a pin or pins, $g$, adapted, when undue pressure is exerted upon the bottom, to break or yield and allow the said bottom to drop or swing downward upon its pivot, substantially as described.

7. In a fertilizer-distributer, the combination of the rotating distributer-wheel C, provided with radially-moving buckets, the casing provided with a channel, the hinged bottom $A^2$ to said channel, the spring G, and the stirrer I, all arranged and operating substantially as and for the purpose described.

8. The sloping inner surface of the distributer-wheel, flange or rim, in combination with the side casing thereof, provided with an opening for the purpose, and substantially as described.

9. The rotary distributer provided with endwise-moving buckets, the discharge-spout, and a carrier arranged above and to one side of the axis of the distributer and over the discharge-spout, said carrier consisting of a double series of radial arms arranged to project downwardly upon either side of the distributer-buckets, substantially as and for the purpose described.

In testimony whereof I have hereunto set my hand this 5th day of April, A. D. 1883.

CHARLES F. JOHNSON.

Witnesses:
C. F. PARMELE,
F. E. BROCKWAY.